(12) United States Patent
Kallabis et al.

(10) Patent No.: US 7,150,106 B2
(45) Date of Patent: Dec. 19, 2006

(54) METHOD OF USING A LEVEL

(75) Inventors: Gabriel Kallabis, Spirkelbach (DE);
Wolfgang Schaefer, Östringen (DE)

(73) Assignee: Stabila-Messgeräte Gustav Ullrich GmbH, Annweiler am Trifels (DE)

( * ) Notice: Subject to any disclaimer, the term of this patent is extended or adjusted under 35 U.S.C. 154(b) by 0 days.

(21) Appl. No.: 11/292,880

(22) Filed: Dec. 2, 2005

(65) Prior Publication Data

US 2006/0143933 A1    Jul. 6, 2006

Related U.S. Application Data

(62) Division of application No. 10/376,462, filed on Feb. 28, 2003, now Pat. No. 6,988,320.

(30) Foreign Application Priority Data

Mar. 1, 2002    (DE)    ............... 202 03 233 U

(51) Int. Cl.
*G01C 9/00* (2006.01)
(52) U.S. Cl. ............... 33/365; 33/451; 33/379
(58) Field of Classification Search ................ 33/365, 33/451, 379
See application file for complete search history.

(56) References Cited

U.S. PATENT DOCUMENTS

| | | | | |
|---|---|---|---|---|
| 508,762 A | * | 11/1893 | Risse | 33/375 |
| 945,275 A | * | 1/1910 | Heistad | 33/374 |
| 1,132,318 A | * | 3/1915 | Feder | 403/341 |
| 1,430,904 A | * | 10/1922 | Hunter | 33/374 |
| 1,690,053 A | * | 10/1928 | Charlton | 33/381 |
| 2,383,166 A | * | 8/1945 | Seiwell | 223/88 |
| 2,879,606 A | * | 3/1959 | Olivere | 33/374 |
| 3,003,054 A | * | 10/1961 | Hubbard | 33/348.2 |
| 3,104,477 A | * | 9/1963 | Edwill | 33/374 |
| 3,225,451 A | * | 12/1965 | Olexson et al. | 33/347 |
| 3,648,378 A | * | 3/1972 | Thingstad et al. | 33/374 |
| 4,561,798 A | * | 12/1985 | Elcrin et al. | 403/109.1 |
| 4,928,395 A | * | 5/1990 | Good | 33/374 |
| 4,979,310 A | * | 12/1990 | Wright | 33/379 |
| 5,165,650 A | * | 11/1992 | Letizia | 248/467 |
| 5,199,177 A | * | 4/1993 | Hutchins et al. | 33/348.2 |
| 5,388,338 A | * | 2/1995 | Majors | 33/376 |
| 5,412,876 A | * | 5/1995 | Scheyer | 33/379 |
| 5,433,011 A | * | 7/1995 | Scarborough et al. | 33/376 |
| 5,479,717 A | * | 1/1996 | von Wedemeyer | 33/379 |
| 5,709,034 A | * | 1/1998 | Kohner | 33/377 |
| 6,418,634 B1 | * | 7/2002 | Szumer | 33/365 |
| 6,675,490 B1 | * | 1/2004 | Krehel et al. | 33/382 |

FOREIGN PATENT DOCUMENTS

| GB | 2080529 A | * | 2/1982 |
|---|---|---|---|
| GB | 2190745 A | * | 11/1987 |

* cited by examiner

*Primary Examiner*—G. Bradley Bennett
*Assistant Examiner*—Amy R. Cohen
(74) *Attorney, Agent, or Firm*—Friedrich Kueffner

(57) ABSTRACT

A water or spirit level is composed of an elongated body, preferably of metal, at least one bubble mounted in the elongated body, and end caps, preferably of plastics material, at the end faces of the elongated body, wherein at least one outer surface of the elongated body constitutes a preferred measuring surface. At least one of the end caps is releasably connected to the level body such that the end cap can optionally be removed and once again replaced.

2 Claims, 4 Drawing Sheets

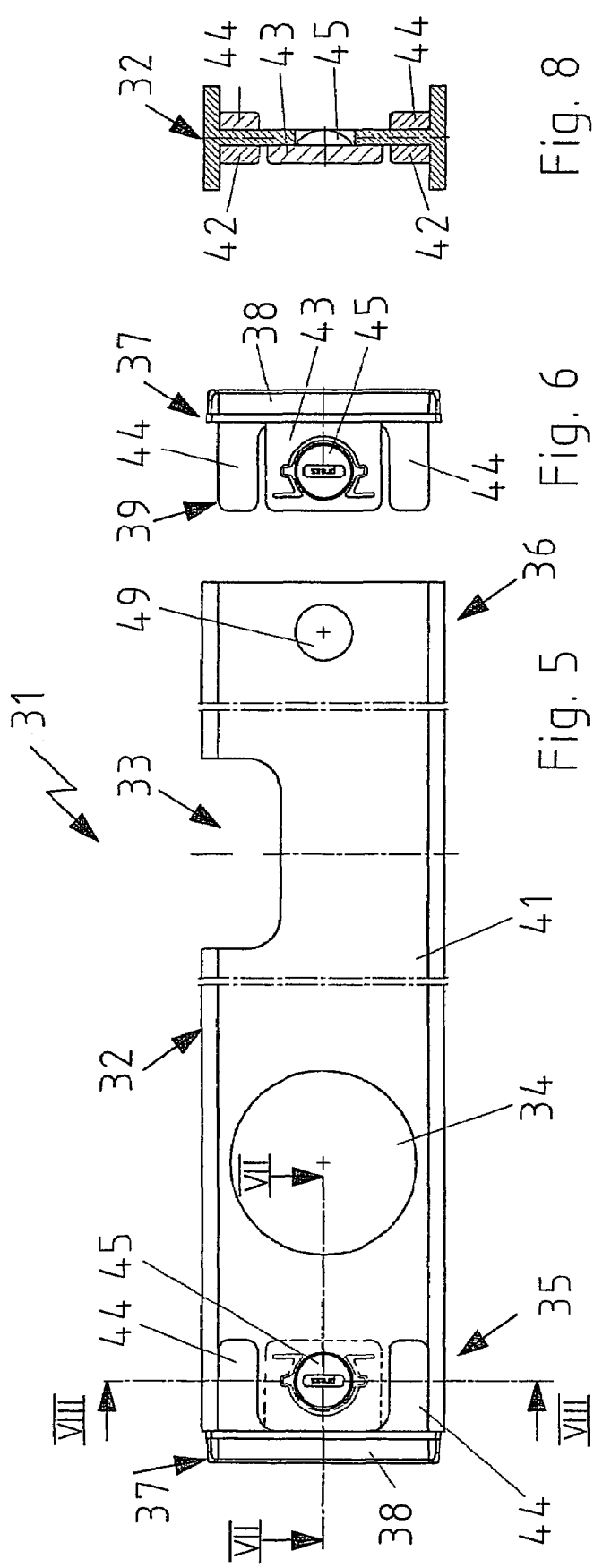
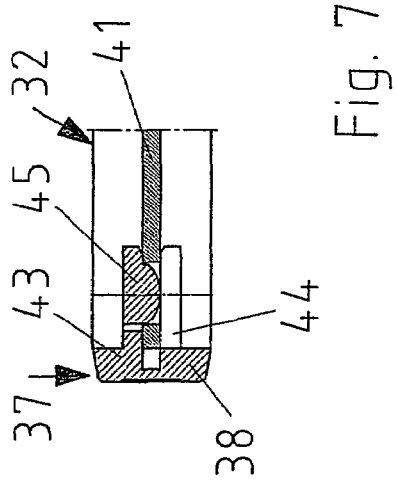
Fig. 5
Fig. 6
Fig. 7
Fig. 8

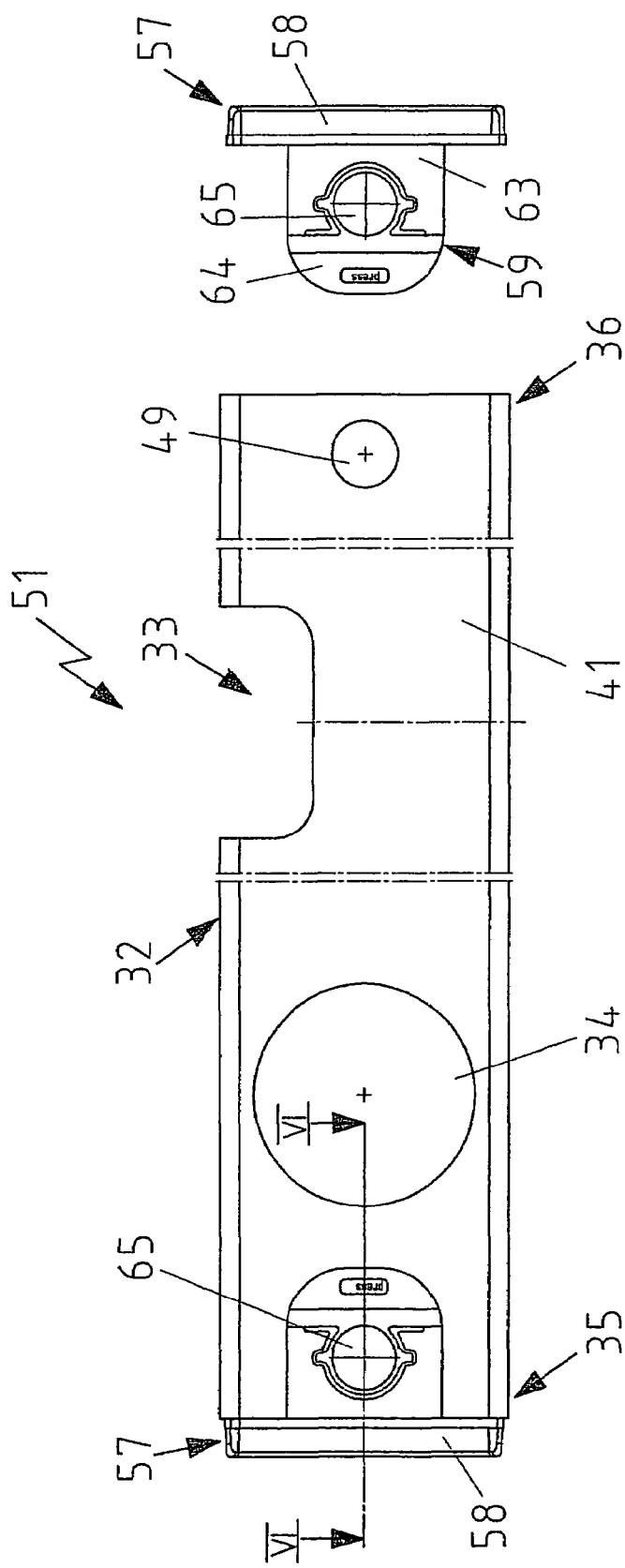
Fig. 9
Fig. 10
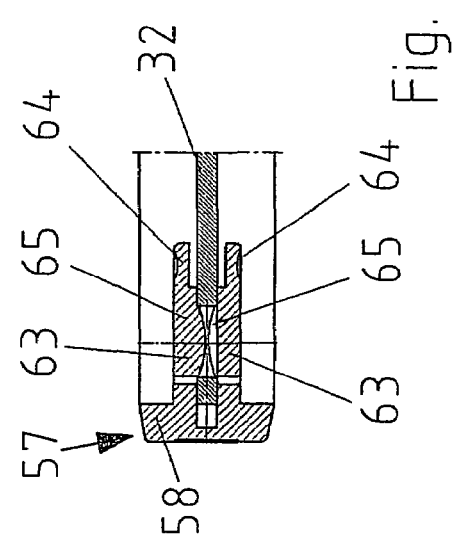
Fig. 11

METHOD OF USING A LEVEL

CROSS-REFERENCE TO RELATED APPLICATIONS

This application is a Divisional Application of U.S. patent application Ser. No. 10/376,462, filed Feb. 28, 2003 now U.S. Pat. No. 6,988,320.

BACKGROUND OF THE INVENTION

1. Field of the Invention

The invention relates to a method of using a water or spirit level composed of an elongated body, preferably of metal, at least one bubble mounted in the elongated body, and end caps, preferably of plastics material, at the end faces of the elongated body, wherein at least one outer surface of the elongated body constitutes a preferred measuring surface.

2. Description of the Related Art

Levels have been for decades manufactured all over the world in large numbers and are used regularly primarily in civil engineering. For reasons of strength and dimensional stability, the body of a level is usually composed of metal, in most cases light metal, and conventionally has a rectangular hollow cross section or a I-shaped solid cross section. In order to prevent damage to the levels in case of impacts or when dropped, the level body is provided with end caps which are composed of a relatively soft, elastic, shock-absorbing material, usually plastics material. When the level body is of a hollow section, the end caps also serve as closures.

A level with an end cap of plastics material is disclosed, for example, in AT 398 846 B. This level has a level body with an I-shaped cross section. The cross section of the end caps is rectangular and their dimensions are adapted to the dimensions of the level body. For fastening the end caps to the level body, the end faces of the level body are provided with two blind-end openings which have several undercuts. The end caps are provided with appropriate lugs which engage positively in the blind-end openings. In this manner, the end caps are inseparably fastened to the level body.

In the manufacture of levels, there is the tendency to construct the shock absorbers at the end caps larger and larger in order to achieve a better protection against damage. However, end caps which are manufactured as injection molded articles have manufacturing tolerances and also have a different coefficient of expansion than the level body. In order to prevent the end caps from projecting beyond the measuring surfaces of the level, the end caps are manufactured with smaller cross sectional dimensions than the level bodies; in addition, also for aesthetic reasons, the end caps are frequently slightly outwardly conically beveled. The smaller cross sectional dimensions result in an undesirable step in the plane of the measuring surface in the joining area between the end cap and the level body.

This has the result that, for example, in the corner area of two walls where a line or marking has to be transferred from one wall to the other, the line or marking cannot be continued precisely around the corner because the measuring surface of the level cannot be placed all the way into the corner because of the presence of the end cap mounted on the end face of the level body. The greater the length of the portion with no line or marking, the more effective the shock absorption of the end cap. This results in inaccuracies.

Many artisans solve this problem by pulling off the end cap by applying great force. However, since the end caps are not designed for such a use, they find no support when they are once again inserted into the level body; rather, the end caps remain separate and become lost. This is not satisfactory.

SUMMARY OF THE INVENTION

Therefore, it is the primary object of the present invention to provide a method of using a level which makes it possible to continue lines or markings precisely around the corner without problems, without giving up the impact protection.

In accordance with the present invention, the method comprises, for transferring the line or marking away from the corner onto the walls, inserting the cap in the level body, and, for continuing the line or marking in the corner, removing one of the end caps from the level body so as to expose an end face thereof, and placing the end face of the level body into the corner from each side of the corner.

The basic concept of the level resides in constructing the connection between an end cap and the level body so as to be releasable, so that the end cap can be optionally removed and replaced again. On the one hand, the connection between the end cap and the level body must be capable of absorbing a sufficient force in order to prevent an unintentional separation of the end cap in the case of impacts; on the other hand, it should be possible for the user to quickly and easily remove the end cap as required and, of course, to place it back onto the level body.

In accordance with a preferred feature of the level, a locking device in the form of a resiliently mounted locking knob is provided on the shaft of the end cap with which the end cap is connected to the end face of the level body, wherein the locking knob extends into or through an indentation or opening provided at the appropriate location in the wall of the level body. Since the locking knob is resiliently fastened to the shaft, the locking knob can be resiliently inserted by applying a compressive force.

The locking knob is inserted when the end cap is mounted on the level body, however, when the indentation or opening in the wall of the level body is reached, the locking knob jumps out and ensures with its outer surface a locking action relative to the wall of the indentation or opening. By pressing in the locking knob, which advantageously is arranged on two oppositely located sides of the level body, the locking action can be released, so that the end cap can be pulled off.

While the use of the locking knob is the preferred solution, which has the advantage that no tool is required for its actuation, there are other embodiments of locking means, for example, by clamping screws or also locking means which act like bayonet closures, or also magnetic locking means.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 5 is a side view of a second embodiment of the level according to the present invention;

FIG. 6 is a side view of an end cap to be mounted on the level of FIG. 5;

FIG. 7 is a sectional view taken along sectional line VII—VII of FIG. 5;

FIG. 8 is a sectional view taken along sectional line VIII—VIII of FIG. 5;

FIG. 9 is a side view of a third embodiment of the level according to the present invention;

FIG. 10 is a side view of an end cap to be mounted on the level of FIG. 9; and

FIG. 11 is a sectional view taken along sectional line XI—XI of FIG. 9.

DESCRIPTION OF THE PREFERRED EMBODIMENTS

Figures 1, 2:
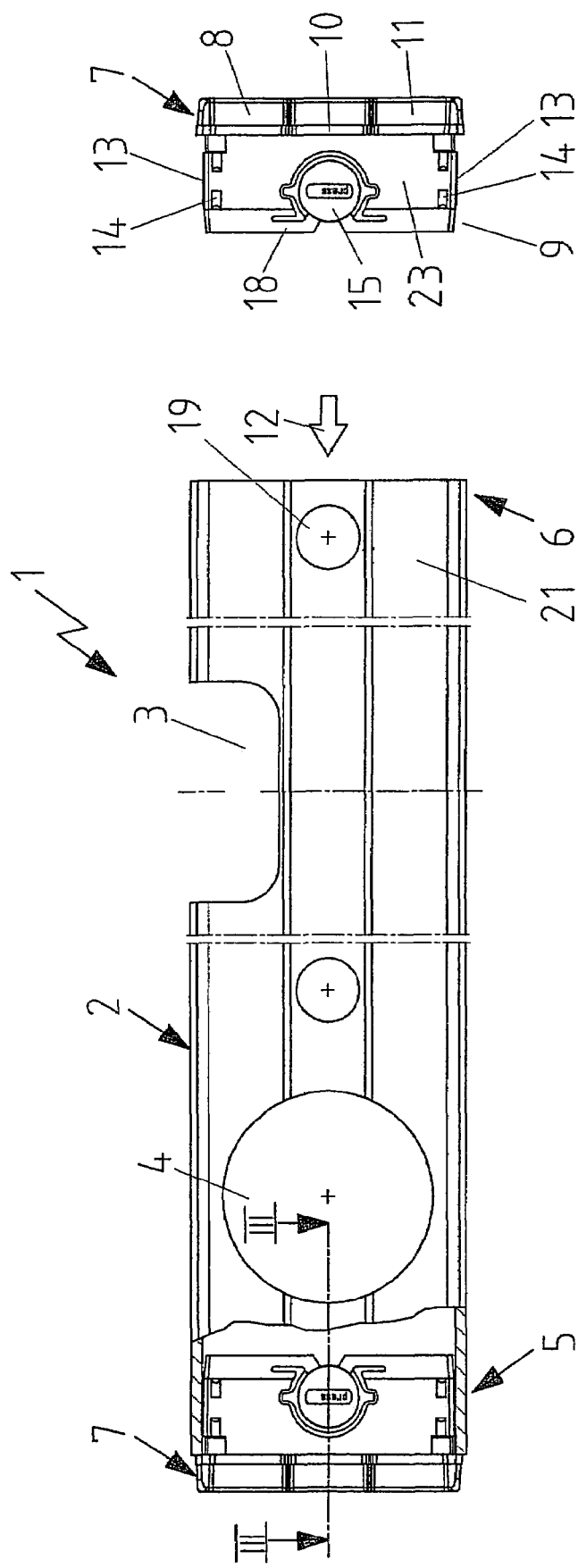
FIG. 1 is a side view of a first embodiment of the level according to the present invention, shown with a portion of the wall of the level body broken away.
FIG. 2 is a side view of an end cap to be mounted on the level of FIG. 1.

FIG. 1 is a side view of a first level 1. The level 1 has an elongated body 2 which is constructed as a hollow profile of metal, particularly light metal, and is provided in the known manner with recesses or openings 3 and 4 for the insertion of bubbles which extend perpendicularly of each other. Of the end caps 7 arranged on the ends 5, 6 at the end faces of the level body 1, the end cap 7 on the left end 5 is shown inserted and partially in section, while the end cap 7 on the right end 6 is shown as FIG. 2 still outside of the body 2 shortly before being inserted.

Figure 4:
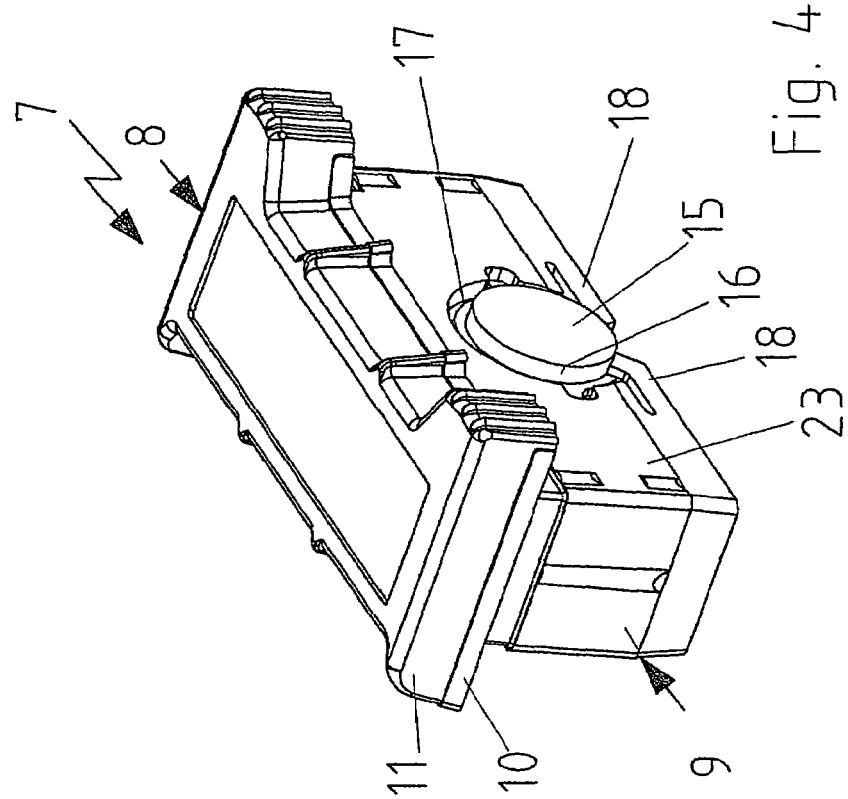
FIG. 4 is a perspective view of the end cap.

The end cap 7, shown in a side view in FIG. 2 and in a perspective view in FIG. 4, is composed of an end plate 8 whose circumference corresponds approximately to the cross section of the body 2 and which with its thickness projects beyond the body 2, and of a hollow shaft 9 connected to the end plate 8. Together with the inner portion 10 of the end plate 8, the hollow shaft 9 is composed of a harder plastics material of higher strength because it must ensure the connection between the end cap 7 and the body 2, and an outer part 11 of the end plate 8 which is of a softer plastics material and serves for shock absorption. The end cap 7 can be manufactured in the known manner in a two-component injection molding process in order to ensure a permanent connection of the parts 10, 11.

The outer dimensions of the hollow shaft 9 are slightly smaller than the inner dimensions of the body 2, so that the end cap 7 can be pushed in the direction of arrow 12 into the hollow space of the body 2, as seen in FIG. 1. In order to be able to compensate for any tolerances, ribs 13, 14 are provided on the outer surfaces of the walls of the shaft 9, wherein the excess dimensions of the ribs are cut off when the end cap is pushed in for the first time, so that a secure frictional engagement is ensured. Further details of the end cap 7 can be seen in FIG. 4.

A locking knob 15 each is provided on opposite sides of the wall 23 of the shaft 9. The locking knobs 15 each have a circular circumference and form a cylindrical portion 16 which protrudes beyond the surface of the respective shaft wall. Each locking knob 15 is located in an opening 17 of the wall 23 of the shaft 9 and is connected to the wall 23 only through two narrow webs 18. The webs 18 are constructed so as to be resilient and twistable, so that the locking knob 15 can be pushed down by applying a pressure onto its surface, wherein the locking knob 15 returns into its original position after the pressure is no longer applied.

Figure 3:
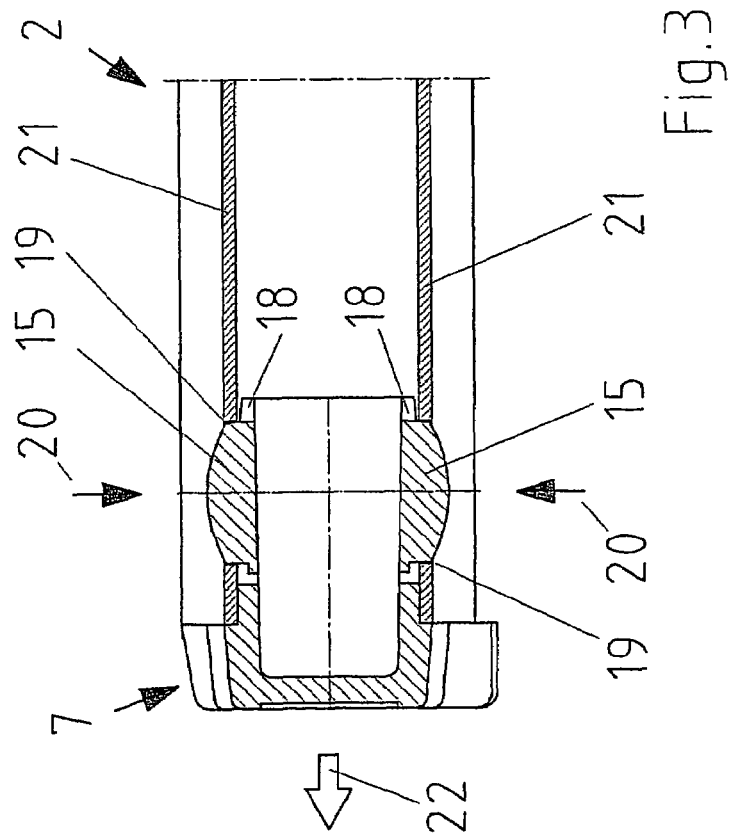
FIG. 3 is a sectional view taken along sectional line III—III of FIG. 1.

Corresponding to the locking knobs 15, openings 19 are provided in the outer wall 21 of the level body 2, wherein, in the inserted state of the end cap 7 shown in FIG. 3, the oppositely located locking knobs 15 extend into and fill out the openings 19. The cylindrical outer surface 16 of each locking knob 15 then is in contact with the circumference of the holes 19, so that the end cap 7 is prevented from being separated from the connection with the body 2 of the level. By exerting a compressive force in the direction of arrows 20, which can be easily accomplished by the thumb and index finger of a hand, the locking knobs 15 can be pushed down to such an extent that the end cap 7 can be pulled off the body 2 of the level 1 without being damaged in the direction of arrow 22 seen in FIG. 3. The reinsertion of the end cap 7 takes place in the reverse sequence.

FIG. 5 is a side view of a second embodiment of the level 31. The level 31 has an elongated body 32 which is constructed as an I-section of metal, particularly light metal, and which is provided in the known manner with recesses or openings 33, 34 for inserting bubbles which extend perpendicularly of each other. Of the end caps 37 arranged at the ends 35, 36 of the level body 32, the end cap 37 at the end 35 is already placed on the level body, while the end cap 37 at the right end 36 is illustrated as FIG. 6 shortly before being placed on the body 32.

The end cap 37 illustrated in FIG. 6 in a side view is composed of an end plate 38 whose circumference corresponds approximately to the cross section of the body 32, and of a shaft 37 connected to the end plate 38.

The shaft 39 is composed of two pairs of parallel, oppositely arranged tongues 42, 44. The distance between the pairs of tongues 42, 44 is adjusted as exactly as possible to the thickness of the wall 41 of the level body 32. Arranged between the pairs of tongues 42, 44 is on the side of the pair of tongues 42 a resilient surface 43 which supports the resiliently lowerable projection 45. Further details of the connections can be seen in FIGS. 7 and 8 which show sectional views along lines VII—VII and VIII—VIII in FIG. 5.

For locking the end caps 37 to the level body 32, the level body 32 has openings 49 into which the projections 45 engage. For releasing the end caps 37, the artisan presses with a finger on the projection 45 and is able to pull off the end cap 37.

FIG. 9 is a side view of a third level 51. The level 51 has an elongated body 32 constructed as an I-section of metal, particularly light metal, and provided with recesses or openings 33, 34 for inserting bubbles which extend perpendicularly of each other. Of the end cap 57 arranged on the ends 35, 36 of the level body 32, the end cap 57 on the left end 35 is placed on the level body 32, while the end cap 57 shown in FIG. 10 on the right end 36 is still outside of the body 32.

The end cap 57 illustrated in FIG. 10 in a side view is composed of an end plate 58 whose circumference approximately corresponds to the cross section of the body 32 and which with its thickness protrudes beyond the body 32, and of a shaft 59 connected to the end plate 58.

The shaft 59 is composed of two parallel, resilient surfaces 63, wherein the distances between the surfaces 63 is adjusted to the thickness of the wall 41 of the level body 32. A projection 65 is integrally formed on each resilient surface 63. Both projections 65 engage in the openings 49 in the wall 41 of the level body 32, as can be seen in FIG. 11.

To be able to separate the end cap 57 from the level body 32, the ends 64 of the resilient surfaces 63 are constructed as actuating surfaces, as illustrated in FIG. 11.

While specific embodiments of the invention have been shown and described in detail to illustrate the inventive principles, it will be understood that the invention may be embodied otherwise without departing from such principles.

We claim:

1. A method for transferring a line or marking onto walls of a room having a corner by using a level, the level including
    an elongated level body,
    at least one bubble placed in the level body,
    an end cap mounted on each end of the level body, wherein
    at least one outer surface of the level body is a measuring surface, and wherein
    the level body having at least one wall arranged to extend between the outer surface and another surface substantially parallel to the measuring surface,
    said end cap having an end member and a shaft extending along said wall, said shaft having a wall with a locking knob, said locking knob having an outer surface that protrudes beyond an outer surface of said wall of said shaft, said locking knob being resiliently connected to said wall of said shaft, said wall of said level body having a through opening for receiving said locking knob when said end cap is mounted on one of said ends of said level body,
    said end caps being releasably attached to the level body, such that the end cap is selectively removable and insertable without tools,
    wherein for transferring the line or marking away from the corner onto the walls, the end caps are inserted into the level body and, for continuing the line or marking in the corner, one of the end caps is removed from the level body so as to expose an end face thereof, and the end face of the level body is placed into the corner.

2. The method according to claim 1, further comprising depressing the locking knob into the indentation or opening for releasing the end cap from the level body, such that the end cap can be pulled from the level body.

* * * * *